United States Patent [19]  
Lo Scalzo et al.

[11] 4,082,714  
[45] Apr. 4, 1978

[54] PROCESS FOR THE EMULSION POLYMERIZATION OF CONJUGATED DIENES

[75] Inventors: Enzo Lo Scalzo, Milan; Franco Ferré, Gorla Minore (Varese); Gianfranco Cantoni, Busto Arsizio (Varese), all of Italy

[73] Assignee: Societa' Italiana Resine S.I.R. S.p.A., Milan, Italy

[21] Appl. No.: 635,193

[22] Filed: Nov. 25, 1975

Related U.S. Application Data

[63] Continuation-in-part of Ser. No. 413,061, Nov. 5, 1973, abandoned.

[30] Foreign Application Priority Data

Nov. 30, 1972  Italy .................... 32269/72

[51] Int. Cl.² .................... C08L 9/10; C08L 9/02; C08L 9/06
[52] U.S. Cl. .................... 260/29.7 R; 260/29.7 T; 260/29.7 UP; 260/29.7 W; 260/95 C; 260/875; 260/876 R; 260/879; 260/880 R; 260/892; 526/80

[58] Field of Search .................... 260/29.7 T, 29.7 R, 260/83.7, 82.3, 84.3, 80.7, 95 C, 29.7 UP, 29.7 W, 876 R, 875, 879, 880 R, 892; 47/270-274

[56] References Cited

U.S. PATENT DOCUMENTS 3,318,831  5/1967  Gauslaa .................... 260/29.7 T

*Primary Examiner*—Thomas De Benedictis, Sr.
*Attorney, Agent, or Firm*—Sughrue, Rothwell, Mion, Zinn and Macpeak

[57] ABSTRACT

Process for the production of latices of conjugated diene polymers and conjugated diene copolymers with vinyl compounds by emulsion polymerization comprising (a) a first polymerization stage in the presence of the monomer as a phase separate from the polymer being formed,
(b) an intermediate stage in which the monomer is added in quantities such that the conversion of the monomer at the end of each individual addition exceeds 45%, and
(c) a final stage in which the reaction is carried to completion.

21 Claims, No Drawings

4,082,714

PROCESS FOR THE EMULSION POLYMERIZATION OF CONJUGATED DIENES

CROSS-REFERENCE TO RELATED APPLICATION

The present application is a continuation-in-part of Ser. No. 413,061 filed Nov. 5, 1973, and now abandoned.

BACKGROUND OF THE INVENTION

1. Field of the Invention

The invention relates to a process for the emulsion polymerization of conjugated dienes, particularly of butadiene. 2. Description of the Prior Art In the emulsion polymerization of conjugated dienes, a heterogeneous system containing additives, such as the activator, the regulator, and other compounds, is formed from the aqueous phase containing the emulsifier and the monomeric hydrocarbon phase; cf. Ullmann, Enzyklopadie der technischen Chemie, Vol. 9, (1957), pp. 325–339.

One of the greatest disadvantages in the production of latices by emulsion polymerization of dienes is gel formation during the polymerization. In the case of butadiene this occurs at conversions of 10 to 80%, and is particularly pronounced from 25 to 60%. The gel formation is associated with a marked increase in the viscosity in the reaction medium, which presents a strong hindrance to stirring. Moreover, laminar layers of increasing thickness and low mobility are formed on the inside walls of the reactor; this is associated with a decrease in the heat-exchange coefficient in the reactor. Under these conditions the emulsion is no longer homogeneous, and difficulties arise in the control of the reaction temperature and the course of the reaction. Moreover, the latices obtained exhibit a pronounced scatter in their particle size. In less critical cases these phenomena can be at least partly eliminated by the use of anchor stirrers or scraper stirrers, which lead to renewal of the viscous layer in the vicinity of the reactor walls and hence improve the heat-exchange of the reactor. However, these measures has not led to success in the production of latices having high solids contents.

Another method that is used to prevent gel formation in the reaction system consists in the addition of considerable quantities of water at regular intervals during the polymerization to achieve substantial dilution of the thickened phase. However, this measure is not particularly advantageous, since the action of the water occurs only intermittently and the stirrability is not appreciably improved. Moreover, the product obtained has a low solids content, and its number average particle diameter is generally less than 1800 A and in any case less than 2000 A.

Another process consists in the addition, during the polymerization, of ionizable compounds whose action causes at least partial agglomeration of the particles, with the result that the surface area to be protected and hence the viscosity of the system decreases. However, this process is also of little advantage owing to the low reproducibility of the working conditions, the high ash content in the end product, and the pronounced lump formation.

Finally, another method makes use of mechanical agglomeration. However, this method is also associated with disadvantages, particularly because it is difficult to adhere precisely to the operating conditions and because particles with a broad particle size distribution are formed.

SUMMARY OF THE INVENTION

One object of the invention is to provide a process for the homopolymerization of conjugated dienes or for the copolymerization of conjugated dienes with vinyl compounds in emulsion, in which gel formation and the disadvantages described above are avoided. This process should be capable of being carried out with the use of conventional, economical stirrer equipment.

A further object is to provide a process for preparing polybutadiene latices having a high solids content.

The process of the invention essentially comprises the addition of predetermined quantities of the monomer together with a chain regulator and an emulsifier in a certain sequence to the aqueous reaction medium, which contains the polymerization catalyst and a dispersing agent.

Thus the invention refers to a process for the production of latices of polymers of conjugated dienes and copolymers of conjugated dienes with vinyl compounds, which have low viscosities, high solids contents, and large, uniform particle sizes and which exhibit no gel formation, by emulsion polymerization, in which the monomers are added together with a chain regulator and an emulsifier to the aqueous reaction medium containing a polymerization catalyst and a dispersing agent, characterized in that:

(a) an initial polymerization stage is carried out in the presence of the monomer as a phase separate from the polymer being formed,
(b) an intermediate stage is carried out in which the monomer is added in quantities such that the rate of conversion of the monomer at the end of each individual addition exceeds about 45%, and
(c) a final stage is carried out in which the reaction is carried to completion It is important that the first (or initial) stage should be complete before gel formation begins. It is also important that the additions in the intermediate stage are carried out while the ratio of monomer to polymer in the reaction medium is less than about 0.65:1 but not less than about 0.25:1. Moreover, these additions should be carried out until the concentration of polymer in the reaction medium reaches about 50 wt.%, but does not exceed about 60 wt%. When the polymer concentration reaches this value in the reaction medium, the polymerization is continued without further addition of monomer until the conversion of the monomer introduced reaches a value of about 75 to 95%. The unreacted monomer is then removed and recovered.

The process of the invention can be applied, for example, to the following dienes: butadiene, isoprene, chloroprene, 2,3-dimethyl-1,3-butadiene, 2-methyl-1,3-pentadiene, 1-cyanobutadiene, 2-methodybutadiene, 3-butyl-1,3-octadiene. These monomers are suitable for the production of homopolymers or of copolymers with vinyl monomers. The process of the invention is preferably used for the emulsion polymerization of butadiene. The process is particularly suitable for the production of polybutadiene latices having solids contents of at least about 40 wt.%, particularly at least 50 wt.%. With solids contents of at least about 50 wt.%, these latices have viscosities of at most about 60 cp, as measured by the Brookfield method at 20° C and 30 rpm, and number average particle diameters of at least about 1800 A and preferably between about 2000 and 2500 A. These latices are particularly suitable for grafting with styrene and acrylonitrile, whereupon high-quality acrylonitrile-butadiene-styrene resins (ABS resins) with high solvent resistance and good mechanical and aesthetic properties are obtained.

In the production of polybutadiene by the process of the invention, particularly advantageous results are obtained if the initial polymerization stage is carried out using a charge of butadiene of from 20 to 40% by weight with respect to the total charge, but preferably 30 to 35 by weight of the total. Below 20% by weight the polymerization kinetics is too slow and the polymerization reaction could fail and stop; above 40% by weight gel formation phenomena is seen to occur. Also, the initial polymerization stage can advantageously be carried out using more than one butadiene charge: separate butadiene phase additions can be employed in order to achieve the 20 to 40% by weight (of total butadiene employed) initial stage butadiene amounts, e.g., a first phase addition of 25% butadiene by weight and a second phase addition of 10% butadiene by weight, or a first phase addition of 25% butadiene by weight, a second phase addition of 5% by weight, a third phase addition of 5% by weight, etc. Furthermore, it should be noted that particularly advantageous results are obtained if the partial conversion of the monomer added to the reaction medium in the intermediate stage is higher than about 48% and the final stage of the polymerization is carried out until the total conversion of the butadiene introduced is about 85 to 95%.

the polybutadiene latices obtained, in addition to high solids contents of at least about 50% and viscosities of at most about 60 cp as measured by the Brookfield method at 20° C and 30 rpm, have large and very uniform particle sizes. The particle diameter is determined by electron microscopy.

Conventional surface active agents used for emulsion polymerization may be used as emulsifiers and dispersing agents in the process of the invention. Particularly advantageous results are obtained by the use of sodium and potassium alkylsulphonates, sodium salts of condensation products of formaldehyde and naphthalenesulphonic acids, sodium and potassium salts of resin acids, sodium lauryl sulphate, sodium alkylarylsulphonates, sodium salts of polyethyleneoxyphosphonic esters, or sodium and potassium salts of fatty acids.

The operating conditions depend on the monomer used. In the case of butadiene, for example, one operates at temperatures of about 0° to 100° C, preferably about 40° to 80° C. The pH is kept at about 7.5 to 12 and preferably at about 9 to 11 by addition of compounds having an alkaline reaction to the reaction medium. The pressure substantially corresponds to the vapor pressure of butadiene under the conditions used.

As catalysts and chain regulators one may use all products that are commonly used for these purposes in the emulsion polymerization of dienes. Examples of catalysts are potassium, sodium, or ammonium persulphate, mixtures containing potassium persulphate, sodium hydrogen sulphite, and ferrous sulphate, or mixtures containing potassium persulphate, sodium hydrogen sulphite, ferrous sulphate, hydrogen peroxide, and dextrose.

Satisfactory results are obtained by the use of aliphatic tertiary mercaptans having 12 to 18 carbon atoms as chain regulators.

The production of polybutadiene by conventional methods is described in Comparison Examples 1 to 4.

COMPARISON EXAMPLE 1

As autoclave with a capacity of 37 liters, fitted with a turbine stirrer having a stirring speed of 240 rpm, a jacket having an area of 0.5 $m^2$ and a device for measurement of the temperature in the reaction mass and in the jacket, is used. This autoclave is initially charged, with stirring, with 0.3 parts by weight of t-dodecyl mercaptan, 73 parts by weight of water, 4 parts by weight of sodium alkysulphonate, 1 part by weight of Daxad 15 (dispersing agent; manufacturer: Grace), 0.5 part by weight of sodium pyrophosphate, and 0.20 part by weight of sodium metabisulphate. The autoclave is purged three times with a stream of nitrogen, and 0.25 part by weight of ammonia and 100 parts by weight of butadiene are then added with stirring. The temperature of the reaction mixture is then brought to 45° C. 0.30 part by weight of ammonium persulphate is then added. A sudden increase in the temperature difference between the reaction mixture and the reactor jacket occurs at a conversion of 25% (the maximum value of $\Delta T$ is 35° C). This phenomenon persists up to a conversion of 60%, and it then gradually declines. During the course of the polymerization the temperature of the reaction mixture is brought to 65° C. Certain difficulties arise here, such as lump formation, problems with the control of the temperature of the reaction mixture, and a marked increase in the power consumption of the stirrer motor during the intermediate polymerization stage. The total reaction time is 85 hours and the final conversion is 92%.

The product obtained has the following properties: solids content 57.2%; pH 10.1; surface tension 49.9 dyne/cm; gel content (determined after contact of the sample with toluene at room temperature for 24 h) 67.6%; Mooney viscosity (determined according to ASTM 1417/10) 99 ML 1+4 (100° C); viscosity determined by the Brookfield method on the latex with 50% solids at 20° C and 30 rpm: 120 cp; number average particle diameter 2600 A; weight average particle diameter 1500 A (thus there is a wide scatter in the particle size). The particle diameters are determined by electron microscopy.

A considerable quantity of lumps can be detected. In the screen test this quantity is 1% (determination of the percentage residue after filtration through a screen with 1000 meshes/$cm^2$).

The latex obtained is then grafted in emulsion with styrene and acrylonitrile under conditions such that an acrylonitrile-butadiene-styrene resin having the following composition is obtained: butadiene 23%; acrylonitrile 20%; and styrene 57%. This ABS resin has the following properties:

| | |
|---|---|
| Izod impact strength | 11 kg.cm/cm |
| Melt index | 0.20 g/10 min |
| Weight loss in n-heptane (resistance to aliphatic solvents) | 15% |

COMPARISON EXAMPLE 2

An autoclave fitted as described in Comparison Example 1 is charged with 0.3 parts by weight of t-dodecyl mercaptan, 75 parts by weight of water, 2.5 parts by weight of sodium resinate, 0.9 part by weight of potassium oleate, and 0.17 part by weight of sodium hydroxide. The autoclave is purged three times with a stream of nitrogen, and 100 parts by weight of butadiene are added with stirring. The temperature of the reaction mixture is then brought to 55° C, and 0.35 part by weight of potassium persulphate is then added. A sudden increase in the temperature difference between the reaction mixture and the autoclave jacket occurs after a conversion of 30% is reached (the maximum value of Δ T is 43° C). This phenomenon persists up to a conversion of 57%, becoming weaker. Certain problems arise here. For example, pronounced lump formation occurs, and it is difficult to follow the course of the reaction, this being due to lack of homogeneity of the reaction mixture. Because of this lack of homogeneity, the samples taken in the course of the reaction are not really representative. The total reaction time is 45 hours, and the final conversion is 89%.

The product obtained has the following properties: solids content 55.4%; pH 11.9; surface tension 48.5 dyne/cm; gel content 74%; Mooney viscosity 118 ML 1+4 (100° C); Brookfield viscosity (measured on a latex with 50% solids at 20° C and 30 rpm) 300 cp; number average particle diameter 1300 A; weight average particle diameter 2000 A (this means a wide scatter of the particle size in the polymerization product).

A considerable quantity of lumps can be detected in the emulsion. Determination of this quantity with a screen having 1000 meshes/cm² gives a value of 5 wt.%.

The latex obtained is then grafted in emulsion with styrene and acrylonitrile in accordance with Comparison Example 1 to obtain an ABS resin having the following properties:

| | |
|---|---|
| Ixod impact strength | 12 kg.cm/cm |
| Melt index | 0.22 g/10 min |
| Weight loss in n-heptane (resistance to aliphatic solvents) | 13% |

COMPARISON EXAMPLE 3

The procedure of Comparison Example 1 is followed, but an anchor stirrer is used instead of a turbine stirrer. Though this measure leads to a decrease in gel formation in the latex at a conversion of 40%, it does not entirely avoid it. The temperature difference between the reaction mixture and the jacket is 20° C. The same difficulties arise as in Comparison Example 1, particularly with regard to the lump formation. The total polymerization time is 84 hours, and the final conversion is 93%.

The product obtained has the following properties: solids content 57.8%; pH 10.2; surface tension 55 dyne/cm; gel content 72%; Mooney viscosity 96 ML 1+4 (100° C); Brookfield viscosity 132 cp; number average particle diameter 1500 A; weight average particle diameter 2600 A (this means a wide scatter of the particle size in the polymer).

Considerable lump formation is also observed. The value is 0.6 wt.% (1000 meshes/cm²).

The latex obtained is then grafted in emulsion with styrene and acrylonitrile in accordance with Comparison Example 1 to obtain an ABS resin having the following properties:

| | |
|---|---|
| Izod impact strength | 13 kg.cm/cm |
| Melt index | 0.22 g/10 min |
| Weight loss in n-heptane | 14% |

COMPARISON EXAMPLE 4

Comparison Example 2 is repeated with an autoclave fitted with an anchor stirrer. The addition of sodium resinate is divided as follows: 40% at the beginning and the remainder in 6 equal portions at butadiene conversions of 20, 30, 40, 50, 60 and 70%. Gel formation in the latex at a conversion of 30% is not avoided by this procedure. The temperature difference between the reaction mixture and the jacket is 20° C. The difficulties described in Comparison Example 2 occur to the same degree. In particular, pronounced lump formation is observed. The total polymerization time is 45 hours, and the final conversion is 90%.

A product having the following properties is obtained: solids content 55.7%; pH 10.3; surface tension 57 dyne/cm; gel content 72%; Mooney viscosity 100 Ml 1+4 (100° C); Brookfield viscosity 280 cp; number average particle diameter 1200 A; weight average particle diameter 2200 A (this indicates pronounced scatter of the particle size in the polymerization product).

Considerable lump formation is also found. The value is 4.5 wt.% (1000 meshes/cm²).

The latex obtained is then grafted with styrene and acrylonitrile in emulsion as described in Example 1 to form an ABS resin having the following properties:

| | |
|---|---|
| Izod impact strength | 12 kg.cm/cm |
| Melt index | 0.25 g/10 min |
| Weight loss in n-heptane | 13.5% |

The invention is further illustrated by the following non-limiting Examples.

EXAMPLE 1

An autoclave corresponding to that described in Comparison Example 1 is charged, with stirring, with 0.07 part by weight of t-dodecyl mercaptan, 63.4 parts by weight of water, 1.3 parts by weight of sodium alkylsulphonate, 1 part by weight of Daxad 15 (dispersing agent; manufacturer: Grace), 0.83 part by weight of sodium pyrophosphate, and 0.10 part by weight of sodium metabisulphite. The autoclave is purged three times with a stream of nitrogen and 0.25 part by weight of ammonia and 25 parts by weight of butadiene are added with stirring. The reaction mixture is then heated to 50° C, and 0.30 part by weight of ammonium persulphate is then added. This is the first polymerization phase, which is carried out in the presence of butadiene as a phase separate from the polymer being formed.

When the partial conversion reaches about 36%, a further 10 parts by weight of butadiene (as a second phase initial polymerization stage butadiene addition), a solution of 0.30 part by weight of sodium alkylsulphonate in 0.90 part by weight of water, and 0.05 part by weight of t-dodecyl mercaptan are added. The partial conversion is increased to 66%, and which corresponds to a polybutadiene concentration of 26% in the reaction mixture. The intermediate stage is then initiated at this point by addition of 10 parts by weight of butadiene, 0.05 part by weight of t-dodecyl mercaptan, and 0.30 part by weight of sodium alkylsulphonate in 1.20 parts by weight of water. Further additions are made corresponding to columns 4, 5, 6 and 7 in Table I when the ratio of butadiene to polybutadiene is 0.55:1, 0.54:1, 0.54:1, and 0.55:1. In this way the conversion of the butadiene present exceeds 48% at the end of each addition. The addition of butadiene is stopped when the polybutadiene concentration is 36.5%. The reaction of butadiene is then continued to a conversion of 90%. The individual stages and additions are practically all carried out in accordance with the foregoing general description.

During the polymerization, which lasts 70 hours, the temperature is gradually brought to 65° C. The pressure corresponds to the vapor pressure of butadiene under the conditions used. No gel formation occurs. The maximum temperature difference between the reaction mixture and the jacket is 2° C. The polymerization is easy to control. No lump formation is observed.

The individual additions are shown in Table I. Each column in the table represents one addition. The first two columns refer to the initial polymerization stage. The product obtained has the following properties: solids content 57.3%; pH 9.9; surface tension 40.5 dyne/cm; gel content 0.78% Mooney viscosity 116 ML 1+4 (100° C); Brookfield viscosity 40 cp; number average particle diameter 2300 A; weight average particle diameter 2400 A.

The lump formation found in the screen test is 0.005% (1000 meshes/cm²).

The latex obtained is then grafted with styrene and acrylonitrile in emulsion as described in Comparison Example 1 to form an ABS resin having the same composition as in Comparison Example 1.

The product obtained has the following properties:

| Izod impact strength | 20 kg.cm/cm |
| Melt index | 0.26 g/10 min |
| Weight loss in n-heptane | 3% |

Table I

| Reactants | Additions | | | | | | | |
|---|---|---|---|---|---|---|---|---|
| (wt.%) | 1 | 2 | 3 | 4 | 5 | 6 | 7 | 8 |
| Butadiene | 25.00 | 10.00 | 10.00 | 15.00 | 20.00 | 10.00 | 10.00 | — |
| t-Dodecyl mercaptan | 0.07 | 0.05 | 0.05 | 0.07 | 0.06 | — | — | — |
| Sodium alkylsulphonate | 1.30 | 0.30 | 0.30 | 0.50 | 0.50 | — | — | 1.00 |
| Dispersing agent (Daxad 15) | 1.00 | — | — | — | — | — | — | — |
| $NH_3$ | 0.25 | — | — | — | — | — | — | — |
| Sodium pyrophosphate | 0.83 | — | — | — | — | — | — | — |
| Sodium metabisulphite | 0.10 | — | — | — | — | — | — | — |
| Ammonium persulphate | 0.30 | — | — | — | — | — | — | — |
| Water | 63.40 | 0.90 | 1.20 | 1.50 | 1.50 | — | — | 3.00 |
| Partial conversion of butadiene at the end of each addition (initial conversion) | 0 | 26 | 51 | 48 | 49 | 58 | 58 | — |
| Partial conversion of butadiene at the beginning of the next addition (final conversion) | 36 | 66 | 64 | 65 | 65 | 64 | 90 | — |
| Total conversion | 0 | 9 | 23 | 29 | 29 | 52 | 58 | 90 |

EXAMPLE 2

The procedure of Example 1, is repeated but the addition 8 of sodium alkylsulphonate shown in Table I is reduced to 0.5 part by weight dissolved in 1.5 parts by weight of water. The catalyst is added at 53° C and the reaction mixture is brought to 65° C only during the last 20 minutes of the polymerization. The reaction time is 60 hours, and the final conversion is 94%. Once again, no gel formation occurs. The maximum temperature difference between the reaction mixture and the autoclave jacket is again 2° C. No lump formation is detected.

The product obtained has the following properties: solids content 58.7%; pH 10.1; surface tension 55.0 dyne/cm; gel content 0.83%; Mooney viscosity 96 ML 1+4 (100° C); Brookfield viscosity 48 cp; number average particle diameter 2100 A; weight average particle diameter 2200 A; quantity of lumps: 0.0003% (1000 meshes/cm²).

The latex obtained is then grafted with styrene and acrylonitrile in emulsion as described in Comparison Example 1 to form an ABS resin having the following properties:

| Izod impact strength | 15.8 kg.cm/cm |
| Melt index | 0.25 g/10 min |
| Weight loss in n-heptane | 3.5% |

EXAMPLE 3

The procedure of Example 2 is followed, but the stirring speed is reduced by 10% in comparison with the foregoing examples. The polymerization proceeds slightly more slowly. The polymerization time is 80 hours and the final conversion is 88%. Here again, no gel formation is observed. The maximum temperature difference between the reaction mixture and the autoclave jacket is 1.5° C.

The product obtained has the following properties: solids content 57.3%; pH 10; surface tension 37 dyne/cm; gel content 0.75%; Mooney viscosity 89 ML 1+4 (100° C); Brookfield viscosity 44 cp; number average particle diameter A; weight average particle diameter 2500 A; quantity of lumps: 0.005% (1000 meshes/cm²).

The latex obtained is then grafted with styrene and acrylonitrile in emulsion as described in Comparison Example 1 to form an ABS resin having the following properties:

| Izod impact strength | 18.2 kg.cm/cm |
| Melt index | 0.22 g/10 min |
| Weight loss in n-heptane | 4% |

EXAMPLE 4

This example is carried out as described in Example 1. The components, quantities, and conversions are shown in Table II.

Table II

| Reactants (parts by | Additions | | | | | | | |
|---|---|---|---|---|---|---|---|---|
| weight) | 1 | 2 | 3 | 4 | 5 | 6 | 7 | 8 |
| Butadiene | 25.00 | 10.00 | 10.00 | 15.00 | 20.00 | 10.00 | 10.00 | — |
| t-dodecilmercaptan | 0.07 | 0.05 | 0.05 | 0.07 | 0.06 | — | — | — |
| Potassium | 1.20 | 0.20 | 0.30 | 0.50 | 0.50 | — | — | 0.50 |

Table II-continued

| Reactants (parts by weight) | Additions | | | | | | | |
|---|---|---|---|---|---|---|---|---|
| | 1 | 2 | 3 | 4 | 5 | 6 | 7 | 8 |
| resinate KOH | 0.17 | — | — | — | — | — | — | — |
| Potassium persulphate | 0.30 | — | — | — | — | — | — | — |
| Water | 63.00 | 1.00 | 1.50 | 2.50 | 2.50 | — | — | 2.50 |
| Partial conversion of butadiene at the end of each addition (initial conversion) | 0 | 26 | 49 | 50 | 50 | 57 | 58 | — |
| Partial conversion of butadiene at the beginning of the next addition (final conversion) | 36 | 63 | 67 | 66 | 65 | 64 | 90 | — |
| Total conversion | 0 | 9 | 22 | 30 | 40 | 52 | 58 | 90 |

The initial temperature of the polymerization is 55° C. The temperature is then gradually raised to 70° C. The reaction time is 55 hours, and the final conversion is 90%. Once again no gel formation occurs. The maximum temperature difference between the reaction mixture and the autoclave jacket is 2° C. No lumps are formed. The course of the polymerization is easily controlled.

The product obtained has the following properties: solids content 56.2% pH 10.6; surface tension 50 dyne/cm; gel content 0.80%; Mooney viscosity 98 ML 1+4 (100° C); Brookfield viscosity 44 cp; number average particle diameter 2100 A; weight average particle diameter 2200 A.

The quantity of lumps in the latex is considerably reduced in relation to Comparison Examples 2 and 4. The value found on measurement in accordance with Comparison Example 2 is 0.020 wt.%.

The latex obtained is then grafted in emulsion with styrene and acrylonitrile as described in Comparison Example 1 to form an ABS resin having the following properties:

| Izod impact strength | 21 kg.cm/cm |
|---|---|
| Melt index | 0.25 g/10 min |
| Weight loss in n-heptane | 4% |

EXAMPLE 5

A polymerization experiment is carried out in a commercial autoclave with a capacity of 16.9 $m^3$ and a heat-exchange area of 23.2 $m^2$. The charging procedure and the operating conditions are as in Example 2. During the reaction the reaction mixture is gradually heated to 65° C, and the procedure is otherwise as in Example 2. The reaction time is 60 hours, and the conversion is 92%. Once again no gel formation occurs. The maximum temperature difference between the reaction mixture and the autoclave jacket is 8.5% with a total conversion of between 55 and 65%. No lumps are formed.

The product obtained has the following properties: solids content 58.2%; pH 9.9; surface tension 48 dyne/cm; gel content 0.86%; Mooney viscosity 99 ML 1+4 (100° C) Brookfield viscosity 45 cp; number average particle diameter 2050 A; weight average particle diameter 2200 A; quantity of lumps 0.0002% (1000 meshes/$cm^2$).

The latex obtained is grafted as described in Comparison Example 1 to form an ABS resin having the following properties:

| Izod impact strength | 20 kg.cm/cm |
|---|---|
| Melt index | 0.25 g/10 min |
| Weight loss in n-heptane | 3% |

EXAMPLE 6

This example was carried out as described in Example 1 except that the initial polymerization stage is carried out with 3 separate phase additions of butadiene of 25%, 5% and 5% by weight, respectively, (indicated as additions 1, 2 and 2') as opposed to the 2-phase, 25% −10% by weight additions in Example 1. The components, quantities, and conversions are shown in Table III.

Table III

| Reactants (parts by weight) | Additions | | | | | | | | |
|---|---|---|---|---|---|---|---|---|---|
| | 1 | 2 | 2' | 3 | 4 | 5 | 6 | 7 | 8 |
| Butadiene | 25.00 | 5.00 | 5.00 | 10.00 | 15.00 | 20.00 | 10.00 | 10.00 | — |
| t-dodecyl mercaptan | 0.07 | 0.03 | 0.02 | 0.05 | 0.07 | 0.06 | — | — | — |
| sodium alkyl-sulphate | 1.30 | 0.15 | 0.15 | 0.30 | 0.50 | 0.50 | — | — | 1.00 |
| DAXAD 15 | 1.00 | — | — | — | — | — | — | — | — |
| $NH_3$ | 0.25 | — | — | — | — | — | — | — | — |
| sodium pyrophosphate | 0.83 | — | — | — | — | — | — | — | — |
| sodium metabisulphite | 0.10 | — | — | — | — | — | — | — | — |
| ammonium persulphate | 0.30 | — | — | — | — | — | — | — | — |
| water | 63.40 | 0.45 | 0.45 | — | — | — | — | — | — |
| Initial conversion | 0 | 26.5 | 54 | 51 | 48 | 49 | 58 | 58 | — |
| Final conversion | 36 | 66 | 65 | 64 | 65 | 65 | 64 | 90 | — |
| Total conversion | 0 | 9 | 19 | 23 | 29 | 39 | 52 | 58 | 90 |

This example resulted in a kinetic slow-down for the intermediate state, resulting in a total reaction duration of 85 hours.

The product obtained had the following properties: solids content 57.3%; pH 9.9; surface tension 38 dyne/cm; gel content 0.83%; Mooney viscosity 110 ML 1+4 (100° C); Brookfield viscosity 36 cp; number average particle diameter 2400 A; weight average particle diameter 2500 A.

EXAMPLE 7

This example was carried out as described in Example 1 except that the initial polymerization stage is carried out with a one phase addition of butadiene of 30% by weight of the total butadiene employed. The components, quantities, and conversions are shown in Table IV.

Table IV

| Reactants (parts by weight) | Additions | | | | | | |
|---|---|---|---|---|---|---|---|
| | 1 | 2 | 3 | 4 | 5 | 6 | 7 |
| Butadiene | 30.00 | 7.5 | 15.00 | 19.00 | 18.5 | 10.0 | — |
| t-dodecyl mercaptan | 0.08 | 0.04 | 0.07 | 0.06 | 0.06 | — | — |
| sodium alkyl-sulphonate | 1.56 | 0.20 | 0.5 | 0.5 | 0.5 | — | 1.00 |
| DAXAD 15 | 1.00 | — | — | — | — | — | — |
| $NH_3$ | 0.25 | — | — | — | — | — | — |
| sodium pyro-phosphate | 0.83 | — | — | — | — | — | — |
| sodium meta-bisulphite | 0.10 | — | — | — | — | — | — |
| ammonium per-sulphate | 0.30 | — | — | — | — | — | — |
| water | 63.40 | 0.6 | 1.5 | 1.5 | 1.5 | — | 3.00 |
| Initial conversion | 0 | 48 | 48 | 49 | 51 | 58.5 | — |
| Final conversion | 60 | 66 | 66 | 64 | 65 | 90 | — |
| Total conversion | 0 | 18 | 25 | 35 | 46 | 58.5 | 90 |

This Example resulted in a quicker reaction kinetics, the reaction duration being 60 hours. The polymerization was regular.

The resulting product had the following properties: solid content 57%; pH 9.9; surface tension 47 dyne/cm; gel content 0.80%; Mooney viscosity 120 ML 1+4 (100° C); Brookfield viscosity 55 cp; number average particle diameter 2100 A; weight average particle diameter 2300 A.

What is claimed is:

1. A process for the production of a low viscosity polybutadiene latex by emulsion polymerization, the latex having a solids content of greater than 40%, uniform particle sizes with average diameters being between about 1800 A and 2500 A, the latex exhibiting no gel formation and being formed in the absence of any agglomeration of the polybutadiene, including the steps of
   (a) adding butadiene monomer with a chain regulator and an emulsifier to an aqueous reaction medium containing a dispersing agent, said butadiene monomer being added in an amount of about 20 to 40% by weight of the total butadiene monomer employed in the process,
   (b) conducting an initial polymerization stage in the presence of the butadiene monomer as a phase separate from the polymer being formed, this initial stage being completed before gel formation begins,
   (c) conducting an intermediate state in which butadiene monomer is added in quantities such that the conversion of the butadiene monomer at the end of each individual addition exceeds 45%, the additions occurring when the ratio of monomer to polymer is less than about 0.65:1 but not less than about 0.25:1, and the additions continuing until the polymer concentration in the reaction medium reaches about 50 wt.%, and
   (d) conducting a final stage such that the reaction is continued to a conversion of about 75 to 95% of the butadiene monomer.

2. A process as in claim 1, wherein the individual monomer additions continue in step (c) until the polymer concentration in the reaction medium reaches about 60 wt.%.

3. A process as in claim 1, wherein the average particle diameters range between 2050 A and 2400 A.

4. A process as in claim 1, including
   (e) removing and recovering the unreacted monomer.

5. A process as in claim 1, wherein the final stage is continued to a conversion of about 85 to 95%.

6. A process as in claim 1, wherein the polymerization is conducted at a temperature of between 0° and 100° C and a pH of about 7.5 to 12.

7. A process as in claim 6, wherein said temperature is about 40° to 80° C.

8. A process as in claim 1, wherein butadiene monomer is added in the intermediate stage such that the conversion of the butadiene monomer at the end of each individual addition exceeds 48%.

9. A process as in claim 1, wherein the latex solids content is 50% and the viscosity of the latex is less than 60 cp as measured on a Brookfield viscometer at 20° C and 30 rpm.

10. A process as in claim 1, wherein the latex solids content ranges from about 56.2 to about 58.7%, and the viscosity ranges from about 40 cp to about 48 cp as measured on a Brookfield viscometer at 20° C and 30 rpm.

11. A process as in claim 1, wherein the latex is formed in the absence of any concentration of the polybutadiene.

12. A process as in claim 1, wherein between steps (b) and (c) steps (a) and (b) are once repeated, such that two separate butadiene monomer additions are employed in the initial polymerization stage, said two separate butadiene monomer addition amounts comprising the 20 to 40% by weight of the total butadiene monomer employed in the process.

13. A process as in claim 12, wherein the first butadiene monomer addition amount is 25% by weight of the total butadiene monomer employed in the process and the second butadiene monomer addition amount is 10% by weight of the total butadiene monomer employed in the process.

14. A process as in claim 1, wherein between steps (b) and (c) steps (a) and (b) are twice repeated such that three separate butadiene monomer additions are employed in the initial polymerization stage, said three separate butadiene monomer addition amounts comprising the 20 to 40% by weight of the total butadiene monomer employed in the process.

15. A process as in claim 14, wherein the first butadiene monomer addition amount is 25% by weight, the second butadiene monomer addition amount is 5% by weight, and the third butadiene monomer addition amount is 5% by weight of the total butadiene monomer employed in the process.

16. A process as in claim 1, wherein said solids content is greater than 50% and said average particle diameter is between 2000 A and 2500 A.

17. A low-viscosity, gel-free polybutadiene latex having a solids content of more than about 40 wt.%, and an average particle diameter of between about 1800 A and about 2500 A, which is suitable for the production of high-quality acrylonitrile-butadiene-styrene resins, prepared by the process of claim 1.

18. A low viscosity, gel-free polybutadiene latex as in claim 17, wherein said average particle diameters range between 2050 A and 2400 A.

19. A low-viscosity, gel-free polybutadiene latex as in claim 17, wherein said solids content is more than about 50 wt.%.

20. A low-viscosity, gel-free butadiene latex as in claim 19, wherein said solids content is 50% and the viscosity as measured on a Brookfield viscometer is less than 60 cp at 20° C and 30 rpm.

21. A low-viscosity, gel-free butadiene latex as in claim 19, wherein said solids content ranges from about 56.2% to about 58.7%, and the viscosity ranges from about 40 cp to about 48 cp as measured on a Brookfield viscometer at 20° C and 30 rpm.

* * * * *